June 15, 1971  R. J. HARDY  3,584,315
DUAL TARP APPARATUS
Filed May 21, 1969  2 Sheets-Sheet 1

INVENTOR
Roger J. Hardy

BY Robert E. Kleve
ATTORNEY

June 15, 1971  R. J. HARDY  3,584,315
DUAL TARP APPARATUS
Filed May 21, 1969  2 Sheets-Sheet 2
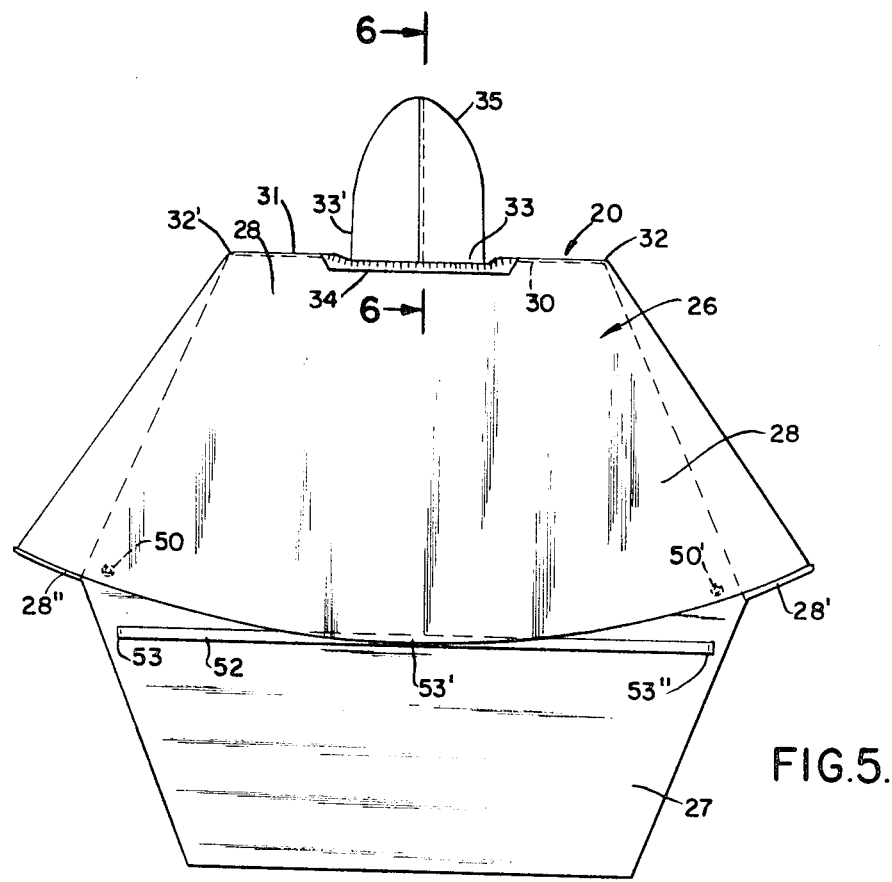
FIG.5.
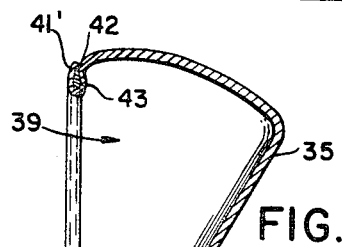
FIG.6.
FIG.8.
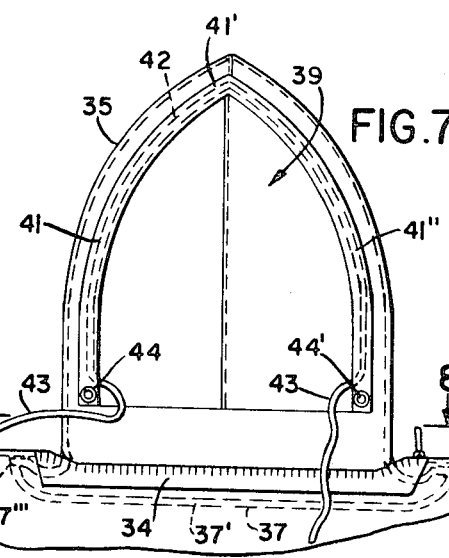
FIG.7.
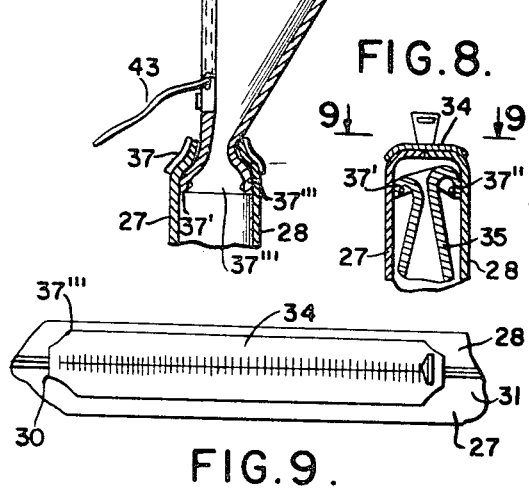
FIG.9.
INVENTOR
Roger J. Hardy
BY Robert E. Kleve
ATTORNEY United States Patent Office 3,584,315
Patented June 15, 1971

3,584,315
DUAL TARP APPARATUS
Roger J. Hardy, 231 Riverside Park Road,
Bismark, N. Dak. 58501
Filed May 21, 1969, Ser. No. 826,365
Int. Cl. A41d *15/04*
U.S. Cl. 2—89    1 Claim

ABSTRACT OF THE DISCLOSURE

The invention comprises a dual purpose tarp, having a front and rear panel connected together and a pair of vertical zippered openings for a wearer to place his arms through and a horizontal zippered opening for the wearer to place his head through with a hood mounted about the horizontal zippered opening for covering the head of the wearer. The tarp is convertable and of a size or shape so that when the zippers are closed the tarp will effectively cover a motorcycle.

---

The invention relates to tarps, or covers, more particularly the invention relates to dual purpose tarps for motorcycles, or motorcycle operators.

It is an object of the invention to provide a novel dual purpose tarp which can be used to effectively cover a motorcycle operator while operating a motorcycle, or may be used to cover a motorcycle.

It is a further object of the invention to provide a novel tarp which will effectively cover a motorcycle to protect it against wind and rain, and which has a construction including a hood whereby it may be instead worn by an operator of the motorcycle to protect the operator from the wind and rain and other elements.

It is a further object of the invention to provide a novel tarp which may be used to cover a cycle or a person.

Further objects and advantages of the invention will become apparent as the description proceeds and when taken in conjunction with the accompanying drawings wherein:

FIG. 5 is a rear elevational view of the dual purpose tarp invention.

FIG. 6 is a cross-sectional view taken along line 6—6 of FIG. 5.

FIG. 7 is an enlarged front elevational view of the hooded portion of the dual purpose tarp invention.

FIG. 8 is a cross-sectional view similar to FIG. 7, with the hood tucked into the tarp and with the hood zipper closed.

FIG. 9 is a cross-sectional view taken along line 8—8 of FIG. 8.

Briefly stated, the invention comprises a tarp having a front and rear panel, with a hooded member mounted to the top thereof, said front panel having a pair of vertical zippers, a horizontal zipper across the hooded portion, said tarp being adapted to be worn by an operator by opening the top horizontal zipper to allow the operator to place his head there through into the hooded member, and opening the vertical zippers to allow the operator to place his hands and arms there through, said front panel having the length to cover the vertical front of a motorcycle and said back panel having the length to cover rearward portions of the motorcycle, whereby when the zippers are closed the tarp may be used to cover a motorcycle.

Figures 1, 2:
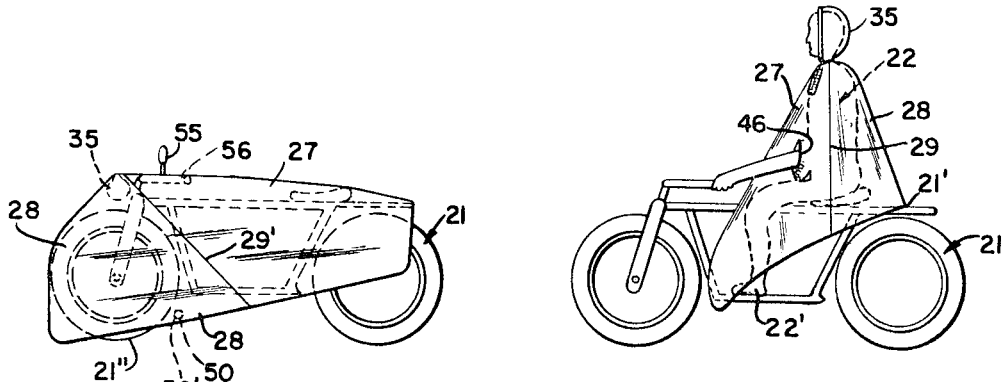
FIG. 1 is a side elevational view of the dual purpose tarp invention illustrating it being used to cover a motorcycle.
FIG. 2 is a side elevational view of the dual purpose tarp invention illustrating it being used to cover an operator.

Referring more particularly to the drawings, in FIG. 1, the dual purpose tarp cover invention 20 is illustrated being used to cover a motorcycle 21. In FIG. 2 the dual purpose tarp invention 20 is shown being used to cover the operator 22 while the operator is driving the motorcycle, 21.

The dual purpose cover invention 20 has a front and rear 25 and 26, respectively, with a front panel 27 and a rear panel 28. The rear panel 28 is shorter than the front panel 27. The back or rear panel 28 also has triangular side edge portions 28' and 28" which are folded over to form side portions of the front 25 of the tarp cover.

The front and rear panels 27 and 28 are sewn together along line 29 and 29' where the side portions 28' and 28" meet the front panel 27. The front and rear panels 27 and 28 are also sewn together along the top shoulder portions 30 and 31, from the outer edges 32 and 32', respectively, to inner edges 33 and 33', respectively of the shoulder portions 30 and 31.

A horizontal zipper 34 connects to the front and rear panel members together from the inner edge 33 to the inner edge 33' so that when the zipper 34 is closed, it entirely closes the top shoulder portions from the outer edge 32 to the outer edge 32'.

Figures 3, 4:
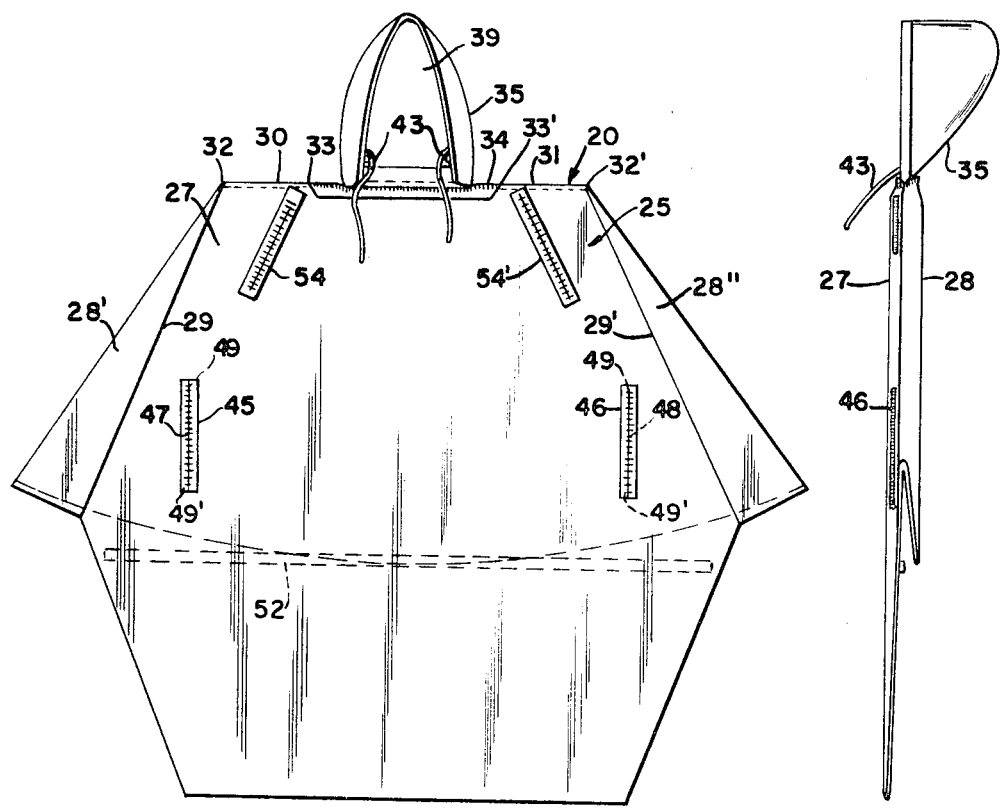
FIG. 3 is a front elevational view of the dual purpose tarp invention.
FIG. 4 is a side elevational view of the duel purpose tarp invention.

When the zipper 34 is opened, the operator may insert his head through the opening in the zipper 34, and into the hood 35, and the shoulder portions 32 and 33 and 32' and 33' will rest on the left and right shoulders respectively of the operator as viewed from FIGS. 2 and 3.

The hood 35 for the operator is mounted to the top of the tarp invention, and has its lower edge 36 sewn to the inside of the top of the tarp, entirely surrounding the zipper 34. The front edge portion 37' of the lower edge is sewn to the front panel 27, the rear edge portion 37" of the lower edge 37 is sewn to the rear panel 28, and the side edge portions 37'" and 37"" of the lower edge 37 are sewn to both the front and rear panels 27 and 28.

The hood 35 has a front opening 39 for the face of the operator's head. The top and side edges 41, 41' and 41" adjacent the front opening 39 are folded back and sewn together to form an inverted U-shaped passageway or channel 42 around edges 41, 41' and 41" for a draw string 43 to be inserted to draw the opening closed. Also, there are a pair of conventional snaps 44 and 44' mounted to the opposite sides of the hood, which may then be snapped together to snuggly close the hood about the operator's neck.

A pair of zippers 45 and 46 are sewn to the front panel 27 to open and close the pair of slits 47 and 48 in the front panel 27. The slits 47 and 48 extend from location 49 to location 49'.

When the zippers 45 and 46 are opened and the zipper 34 is open the operator may place the tarp over him and insert his head through the opening provided by zipper 34 and into the hood 35, and may place his left and right arms through the openings provided by zippers 45 and 46, respectively, as illustrated in FIG. 2 and wear the tarp as a raincoat while riding the motorcycle 21, as illustrated in FIG. 2. The front panel 27 will cover the front of the operator entirely including his feet 22' while he is seated on the motorcycle, and the rear panel 28 will entirely cover the back of the operator by extending down to the motorcycle top near portions 21' of the motorcycle. An elastic leg strap or strip 52 is sewn to the inside of the front panel 27 at three locations 53, 53' and 53" and is free of the panel 27 between these locations. The operator will place his left leg between the strip 52 and the panel 27 between sewn locations 53 and 53' and will place his right leg between the strip 52 and front panel between sewn locations 53' and 53" to attach the lower portion of the front panel 27 to the legs of the operator.

When the tarp member 20 is used as a motorcycle cover the hood 35 will be tucked into the tarp between panels 27 and 28 from its position illustrated in FIGS. 2, 3, 4, 6 and 7, to its position illustrated in FIGS. 1, 8 and 9. The zippers 45 and 46 will also be closed and the tarp will be placed over the motorcycle 21 in the manner illustrated in FIG. 1, with the panels 27 and 28 being relatively wide so as to enable the tarp to flare outward from the front to the rear of the motorcycle, so that the rear panel 28 will cover the front portion of the motorcycle and the front panel 27 will cover the central and rearward portions of the motorcycle 21, as illustrated in FIG. 1.

A pair of snaps 50 and 50' are provided on the rear panel 28, which snap together immediately behind the front wheel 21" of the motorcycle 21, to secure the tarp 20 to the motorcycle, 21.

A pair of zippers 54 and 54' open slits in the front panel 27 corresponding in length and location to their respective zippers.

The pair of zippers 54 and 54' extend generally along the location of the handle bars 55 of the motorcycle, when the tarp invention is used as a motorcycle cover, with zipper 54 following generally along the location of the left handle bar and zipper 54' following generally along the location of the right handle bar.

When the tarp invention is placed over the motorcycle to be used as a motorcycle cover, the left or right zippers 54 or 54' may be opened to allow reflecting mirrors and other objects mounted to the handle bars to project through the panel 27.

In FIG. 1, a reflecting mirror 55 is illustrated mounted to the left handle bar 6 of the motorcycle 21 and is projecting through the open zipper 54 in the panel 27 of the tarp cover.

Thus it will be seen that a novel dual purpose tarp cover invention has been provided which will effectively cover the operator of a motorcycle while he is seated upon and driving the motorcycle, and which when inverted and the zippers are closed will effectively cover the motorcycle itself.

It will be obvious that various changes and departures may be made to the invention without departing from the spirit and scope thereof and accordingly it is not intended that the invention be limited to that specifically described in the specification or as illustrated in the drawings, but only as set forth in the appended claim wherein:

What is claimed is:

1. A dual tarp apparatus for covering a motorcycle or a motorcycle operator while operating said motorcycle with said motorcycle having a reflecting mirror mounted on its handle bars, said apparatus comprising a front and rear panel connected together along their top and side edge portions, said rear panel being shorter than said front panel, a zipper selectively opening and closing said top portions together centrally along said top portion, a hood mounted to said top portions of said panels and extending about said first mentioned zipper, said front panel having a pair of openings in spaced relation along the front panel with a pair of zippers to open and close said pair of openings and with said first mentioned zipper and said first mentioned pair of zippers acting to open their respective openings for receiving the head of the operator into said hood and for receiving the hands of the operator, respectively, of said motorcycle operator when wearing the tarp apparatus while operating the motorcycle, said tarp apparatus being of a length when inverted to cover the top and front of said motorcycle, a second pair of zippers on said front panel above said first mentioned pair of zippers adapted to be opened to receive said reflecting mirror on said handle bars when said tarp covers said motorcycle.

References Cited

UNITED STATES PATENTS

| | | | |
|---|---|---|---|
| 484,945 | 10/1892 | Aldrich | 2—84 |
| 531,695 | 1/1895 | Orr | 2—88 |
| 1,270,704 | 6/1918 | Creery | 2—88 |
| 1,895,911 | 1/1933 | Bosson | 2—84X |
| 3,381,306 | 5/1968 | Innez | 2—88(X) |
| 1,078,992 | 11/1913 | Bryan | 2—89 |

FOREIGN PATENTS

| | | | |
|---|---|---|---|
| 84,839 | 6/1895 | Germany | 2—87 |

RICHARD J. SCANLAN, JR., Primary Examiner